(12) United States Patent
Mondal (10) Patent No.: US 11,328,018 B2
(45) Date of Patent: May 10, 2022

(54) SYSTEM AND METHOD FOR STATE DEPENDENCY BASED TASK EXECUTION AND NATURAL LANGUAGE RESPONSE GENERATION

(71) Applicant: Wizergos Software Solutions Private Limited, Bangalore (IN)

(72) Inventor: Shibabrata Mondal, Bangalore (IN)

(73) Assignee: Wizergos Software Solutions Private Limited

( * ) Notice: Subject to any disclaimer, the term of this patent is extended or adjusted under 35 U.S.C. 154(b) by 246 days.

(21) Appl. No.: 16/696,677

(22) Filed: Nov. 26, 2019

(65) Prior Publication Data
US 2021/0064667 A1 Mar. 4, 2021

(30) Foreign Application Priority Data
Aug. 26, 2019 (IN) .............................. 201941034358

(51) Int. Cl.
*G06F 3/048* (2013.01)
*G06F 40/205* (2020.01)
(Continued)

(52) U.S. Cl.
CPC ........ *G06F 16/90332* (2019.01); *G06F 40/56* (2020.01); *G06F 40/58* (2020.01)

(58) Field of Classification Search
CPC ................ G06F 16/903; G06F 16/248; G06F 16/90332; G06F 3/167; G06F 9/451;
(Continued)

(56) References Cited

U.S. PATENT DOCUMENTS 7,302,383 B2 * 11/2007 Valles ..................... G06F 40/30
704/9
7,720,674 B2 5/2010 Kaiser et al.
(Continued)

FOREIGN PATENT DOCUMENTS

WO 2015054461 A1 4/2015

OTHER PUBLICATIONS

Mitul Makadia, 5 Reasons Why Your Chatbot Needs Natural Language Processing, May 1, 2019, https://towardsdatascience.com/5-reasons-why-your-chatbot-needs-natural-language-processing-ed20fb0a3655; Last Viewed at: Nov. 21, 2019.

*Primary Examiner* — Olujimi A Adesanya
(74) *Attorney, Agent, or Firm* — Jason C. Cameron (57) ABSTRACT

A system for state dependency-based task execution and natural language response generation is disclosed. The system includes an input request acquisition subsystem to obtain a plurality of natural language input requests from one or more sources through at least one information capturing medium; a state definition subsystem to determine a plurality of states for a plurality of obtained natural language input requests; a state dependency definition subsystem to create a list of a plurality of determined states required to generate a dependency order, to analyse a generated dependency order of the plurality of determined states, to generate a dynamic working procedure to generate a temporary natural language response; a state based response generation subsystem to generate a structured natural language response dynamically upon successful execution of the dynamic working procedure.

8 Claims, 8 Drawing Sheets

(51) Int. Cl.
*G06F 16/9032* (2019.01)
*G06F 40/58* (2020.01)
*G06F 40/56* (2020.01)

(58) Field of Classification Search
CPC ................. G06F 16/219; G06F 16/243; G06F 16/90335; G06F 40/20
See application file for complete search history.

(56) References Cited

U.S. PATENT DOCUMENTS

| | | | |
|---|---|---|---|
| 2013/0268260 A1* | 10/2013 | Lundberg | G06F 40/40 704/8 |
| 2013/0339377 A1* | 12/2013 | Iwama | G06F 16/23 707/758 |
| 2014/0258857 A1* | 9/2014 | Dykstra-Erickson | G06F 3/0481 715/708 |
| 2017/0116581 A1* | 4/2017 | Shah | G06Q 10/1097 |
| 2017/0212884 A1* | 7/2017 | Kim | G06F 40/40 |
| 2017/0337265 A1 | 11/2017 | Garrett et al. | |
| 2018/0004729 A1* | 1/2018 | Qiu | G06F 40/205 |
| 2018/0090143 A1* | 3/2018 | Saddler | G10L 15/22 |
| 2018/0349353 A1 | 12/2018 | Qian et al. | |
| 2019/0205461 A1* | 7/2019 | Rodgers | G06F 3/167 |
| 2019/0377619 A1* | 12/2019 | Riva | G06N 5/022 |

\* cited by examiner

SYSTEM AND METHOD FOR STATE DEPENDENCY BASED TASK EXECUTION AND NATURAL LANGUAGE RESPONSE GENERATION

This US application claims priority from a complete patent application filed in India having Patent Application No. 201941034358, filed on Aug. 26, 2019 titled "SYSTEM AND METHOD FOR STATE DEPENDENCY BASED TASK EXECUTION AND NATURAL LANGUAGE RESPONSE GENERATION"

BACKGROUND

Embodiments of the present disclosure relate to an information system for processing natural language queries and more particularly to a system and a method for state-dependency based user defined task execution and a natural language response generation.

A conversational agent is an information system which interprets and responds to statements made by one or more users in ordinary natural language. The conversational agent integrates computational linguistics techniques with communication over the internet. Such conversational agents nowadays are used in one or more areas such as educational training system, a product-based industry, a service-based industry or a combination thereof. The conversational agent in order to provide information access to the one or more users performs a series of tasks, wherein the series of tasks include identifying context and content of information for a particular query, indexing an identified context and content of the particular query and providing the one or more users desired results through a user interface. Various such conversational searching systems are available which includes the conversational agent for the task completion and response generation in a conversation.

Conventionally, the system available for the task completion and the response generation in the conversation includes understanding an intent of the information of the particular query and providing a generalised solution to the one or more users. However, such a system lacks the ability to define and execute arbitrary task execution for automation without the need to add custom code for each user intent. Also, such systems are generalised and unable to provide personalised or customised response to the one or more users upon requirement. Moreover, such systems have a limited capability of understanding one or more vernaculars. Furthermore, such systems are unable to dynamically learn based on user requests or feedback in order to improve efficiency or performance. Furthermore, such systems also provide inaccurate results due to inability of managing with vast amount of information and discerning and providing relevant information to the one or more users in case of complicated queries.

Hence, there is a need for an improved system and a method for an ability to execute arbitrary set of tasks and natural language response generation without having to create custom code for each user intent in order to address aforementioned issues.

BRIEF DESCRIPTION

In accordance with an embodiment of the present disclosure, a system for arbitrary state dependency-based task execution and natural language response generation without the need for any custom code for each user intent is disclosed. The system includes an input request acquisition subsystem configured to obtain a plurality of natural language input requests from one or more sources through at least one information capturing medium. The system also includes a state definition subsystem operatively coupled to the input request acquisition subsystem. The state definition subsystem is configured to determine a plurality of states for a plurality of obtained natural language input requests. The system also includes a state dependency definition subsystem operatively coupled to the state definition subsystem. The state dependency definition subsystem is configured to create a list of a plurality of determined states required to generate a dependency order. The state dependency definition subsystem is also configured to analyse a generated dependency order of the plurality of determined states from a created list of the plurality of determined states for state accomplishment. The state dependency definition subsystem is also configured to generate a dynamic working procedure to generate a temporary natural language response corresponding to the plurality of obtained natural language input requests based on a plurality of current states and an analysed dependency order. The system also includes a state-based response generation subsystem operatively coupled to the state dependency definition subsystem. The state-based response generation subsystem is configured to generate a structured natural language response dynamically upon successful execution of the dynamic working procedure.

In accordance with another embodiment of the present disclosure, a method for arbitrary state dependency-based task execution and natural language response generation without the need for any custom code for each user intent is disclosed. The method includes obtaining, by an input request acquisition subsystem, a plurality of natural language input requests from one or more sources through at least one information capturing medium. The method also includes determining, by a state definition subsystem, a plurality of states for a plurality of obtained natural language input requests. The method also includes creating, by a state dependency definition subsystem, a list of a plurality of determined states required to generate a dependency order. The method also includes analysing, by the state dependency definition subsystem, a generated dependency order of the plurality of determined states from a created list of the plurality of determined states for state accomplishment. The method also includes generating, by the state dependency definition subsystem, a dynamic working procedure to generate a temporary natural language response corresponding to the plurality of obtained natural language input requests based on a plurality of current states and an analysed dependency order. The method also includes generating, by a state-based response generation subsystem, a structured natural language response dynamically upon successful execution of the dynamic working procedure.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for arbitrary state dependency-based task execution and natural language response generation without the need for any custom code for each user intent is disclosed. The system includes an input request acquisition subsystem configured to obtain a plurality of natural language input requests from one or more sources through at least one information capturing medium. The system also includes a state definition subsystem operatively coupled to the input request acquisition subsystem. The state definition subsystem is configured to determine a plurality of states for a plurality of obtained natural language input requests. The system also includes a state dependency definition subsystem operatively coupled to the state definition subsystem. The state dependency definition subsystem is configured to create a list of a plurality of determined states required to generate a dependency order. The state dependency definition subsystem is also configured to analyse a generated dependency order of the plurality of determined states from a created list of the plurality of determined states for state accomplishment. The state dependency definition subsystem is also configured to generate a dynamic working procedure to generate a temporary natural language response corresponding to the plurality of obtained natural language input requests based on a plurality of current states and an analysed dependency order. The system also includes a state-based response generation subsystem operatively coupled to the state dependency definition subsystem. The state-based response generation subsystem is configured to generate a structured natural language response dynamically upon successful execution of the dynamic working procedure.

Figure 1:
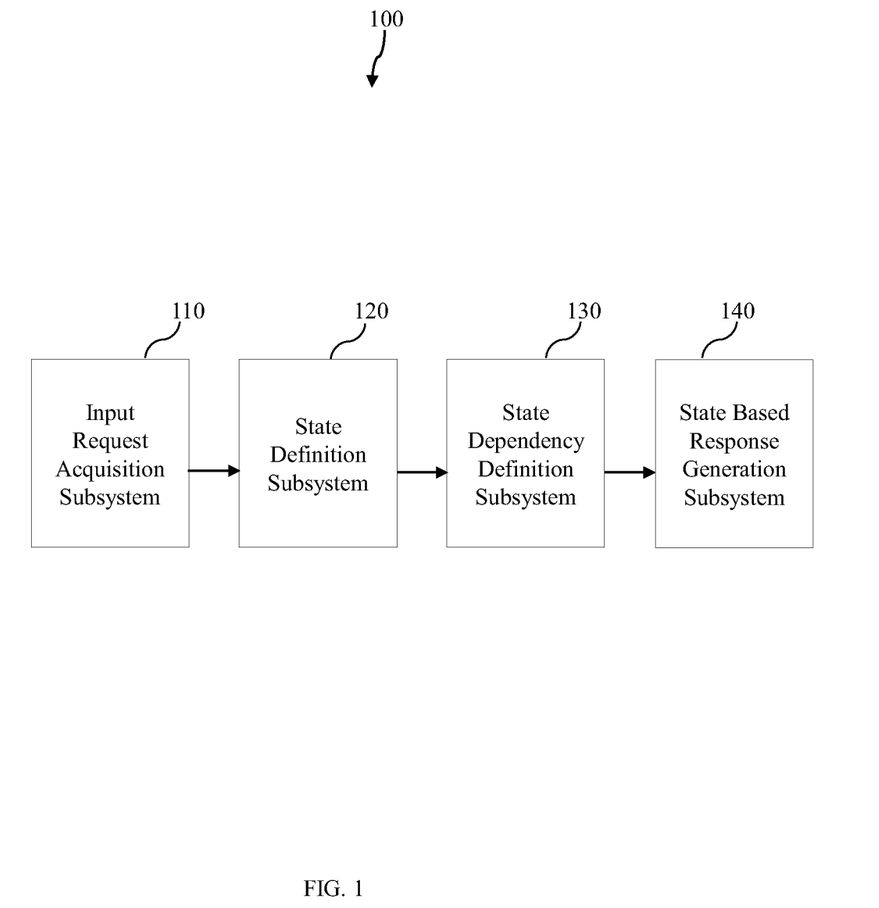
FIG. 1 is a block diagram of a system for natural language response generation in accordance with an embodiment of the present disclosure.

FIG. 1 is a block diagram of a system 100 for state dependency-based task execution and natural language response generation in accordance with an embodiment of the present disclosure. The system 100 includes an input request acquisition subsystem 110 configured to obtain a plurality of natural language input requests from one or more sources through at least one information capturing medium. As used herein, the term 'a plurality of natural language input requests' is defined as one or more requests or information obtained in a human language or a non-programming computer language for interaction with a machine. In one embodiment, the plurality of natural language input requests may include at least one of an audio input, a video input, a text input including an alphanumeric character or a combination thereof. In some embodiment, the one or more sources may include at least one of a user request, a timer event, an external event or a combination thereof. As used herein, the term 'user request' is defined as an input message received from the user in form of a query, data or a sentence. Similarly, the term 'timer event' is defined as an event or an activity which is triggered by a predefined timer to start a process. Similarly, the term 'external event' is defined as an event which triggers the input request acquisition subsystem to obtain the plurality of natural language input requests from an internal or an external information system through an application programming interface (API) call. Here, the term 'information system' is defined as a set of instructions used to instruct a machine to perform specific tasks. In one embodiment, the at least one information capturing medium may include at least one of an image capturing device, an audio capturing device, a keyboard, a mouse, a touch screen, an application programming interface (API) call for the internal or an external information system, a series of data transformation activities or a combination thereof. In some embodiment, the series of data transformation activities may include a process of converting data from one structural format into another structural format by performing complicated computations.

The system 100 also includes a state definition subsystem 120 operatively coupled to the input request acquisition subsystem 110. The state definition subsystem 120 is configured to determine a plurality of states for a plurality of obtained natural language input requests. As used herein, the term 'plurality of states' is defined as a plurality of variables or named attributes for measuring one or more values of the plurality of input requests. An operation of the state definition subsystem 120 is depicted in detail in FIG. 2. The state definition subsystem determines the plurality of states through one or more processes in step 121. Here, the state definition subsystem 120 also selects a state accomplishment method of a plurality of determined states for the one or more sources in step 122. In one embodiment, the state accomplishment method of the plurality of determined states for the one or more sources may include defining a validation type or generic validation for the user request, defining a representational state transfer (REST) or a simple object access (SOAP) protocol or in-build API calls for defining the endpoint, input structure, output structure and pre and post processing of the data obtained from the internal or the external system and defining the series of data transformations, selected from a list of pre-defined data transformation options.

Figure 2:
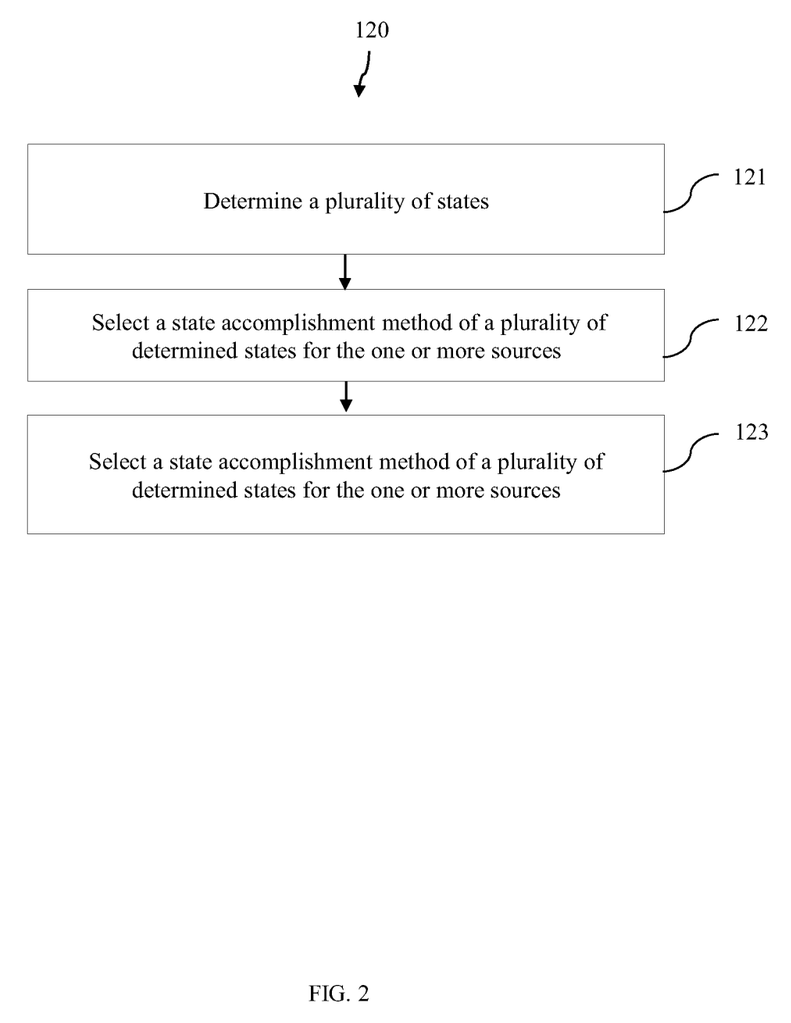
FIG. 2 is a schematic representation of a state definition subsystem of a system for natural language response generation of FIG. 1 in accordance with an embodiment of the present disclosure.

The state definition subsystem 120 also includes defining a series of data transformation activities for a selected state accomplishment method upon selection of a data transformation system in step 123. In one embodiment, the plurality of determined states may include at least one of a name of the state, a description of the state, a type of the state, a volatility property of the state, an accomplishment method of the state or a combination thereof. In some embodiment, the type of the state may include but not limited to phone number, email address, location, money, name, and structured data types like lists and dictionary.

Figure 3:
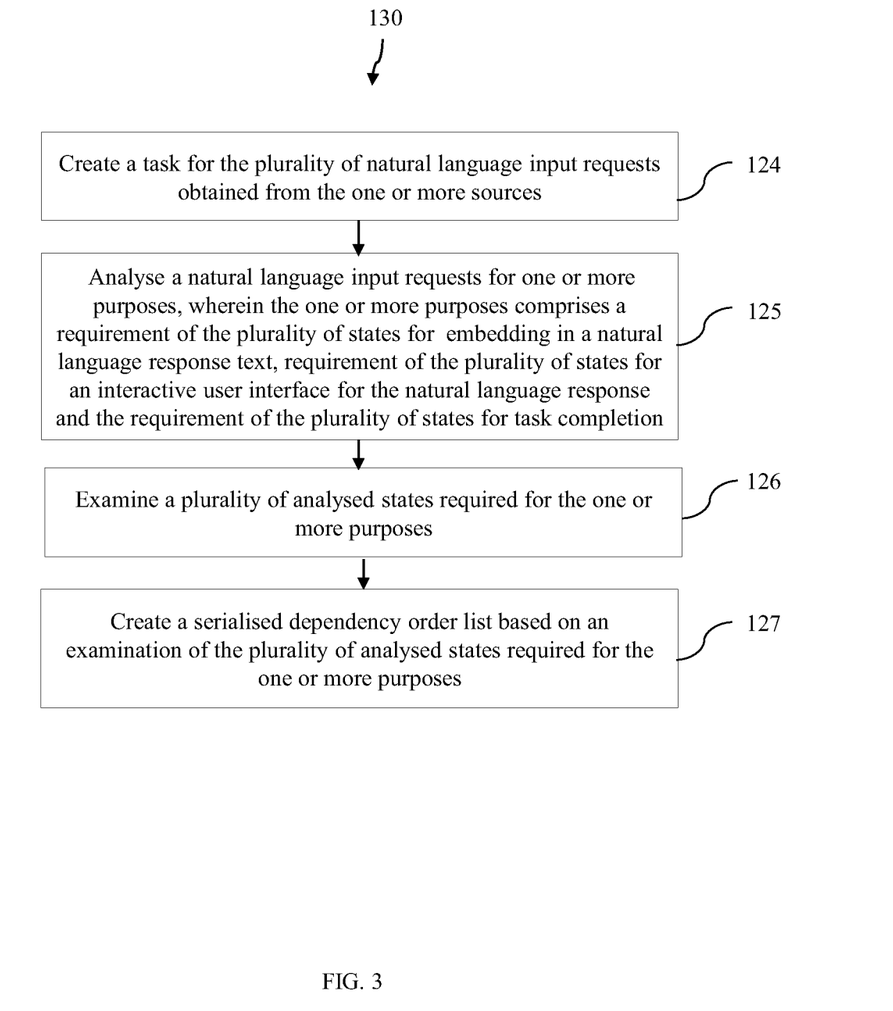
FIG. 3 is a schematic representation of a state dependency definition subsystem of a system for natural language response generation of FIG. 1 in accordance with an embodiment of the present disclosure.

Referring back to FIG. 1, the system 100 also includes a state dependency definition subsystem 130 operatively coupled to the state definition subsystem 120. The state dependency definition subsystem 130 is configured to create a list of a plurality of determined states required to generate a dependency order. The state dependency definition subsystem 130 creates the list of the plurality of determined states, wherein the plurality of determined states is obtained from the plurality of natural language input requests from the one or more sources. The detailed description of the state dependency definition subsystem 130 is shown in FIG. 3. The state dependency subsystem 130 creates a task for the plurality of natural language input requests obtained from the one or more sources in step 124. Then, upon creation of the task, the state dependency definition subsystem analyses a requirement of the plurality of states for the plurality of natural language input requests for one or more purposes, wherein the one or more purposes comprises a requirement of the plurality of states for embedding in a natural language response text, requirement of the plurality of states for an interactive user interface for the natural language response and the requirement of the plurality of states for task completion in step 125.

In one embodiment, the plurality of states for embedding in the natural language response text, the plurality of states for the interactive user interface for the natural language response text, and the plurality of states for the task completion may be required for a natural language response creation system from the one or more sources. In another embodiment, the plurality of states for the task completion may be required for timer based task creation system from the one or more sources and the plurality of states for the task completion may be also required for a timer based task creation system and an external event based task creation system from an external event based task creation system from the one or more sources. The state dependency definition subsystem 130 is also configured to examine a plurality of analysed states required for the one or more purposes in step 126. The state dependency subsystem 130 is also configured to create a serialised dependency order list based on an examination of the plurality of analysed states required for the one or more purposes in step 127.

The state dependency definition subsystem 130 is also configured to analyse a generated dependency order of the plurality of determined states from a created list of the plurality of determined states for state accomplishment. The state dependency definition subsystem 130 analyses the generated dependency order of the plurality of determined states in order to check a correct order in which such plurality of determined states need to be accomplished or fulfilled. The state dependency definition subsystem 130 is also configured to generate a dynamic working procedure to generate a temporary natural language response corresponding to the plurality of obtained natural language input requests based on a plurality of current states and an analysed dependency order. In one embodiment, the plurality of current states may include one or more states obtained at present time from the plurality of natural language input requests.

Figure 4:
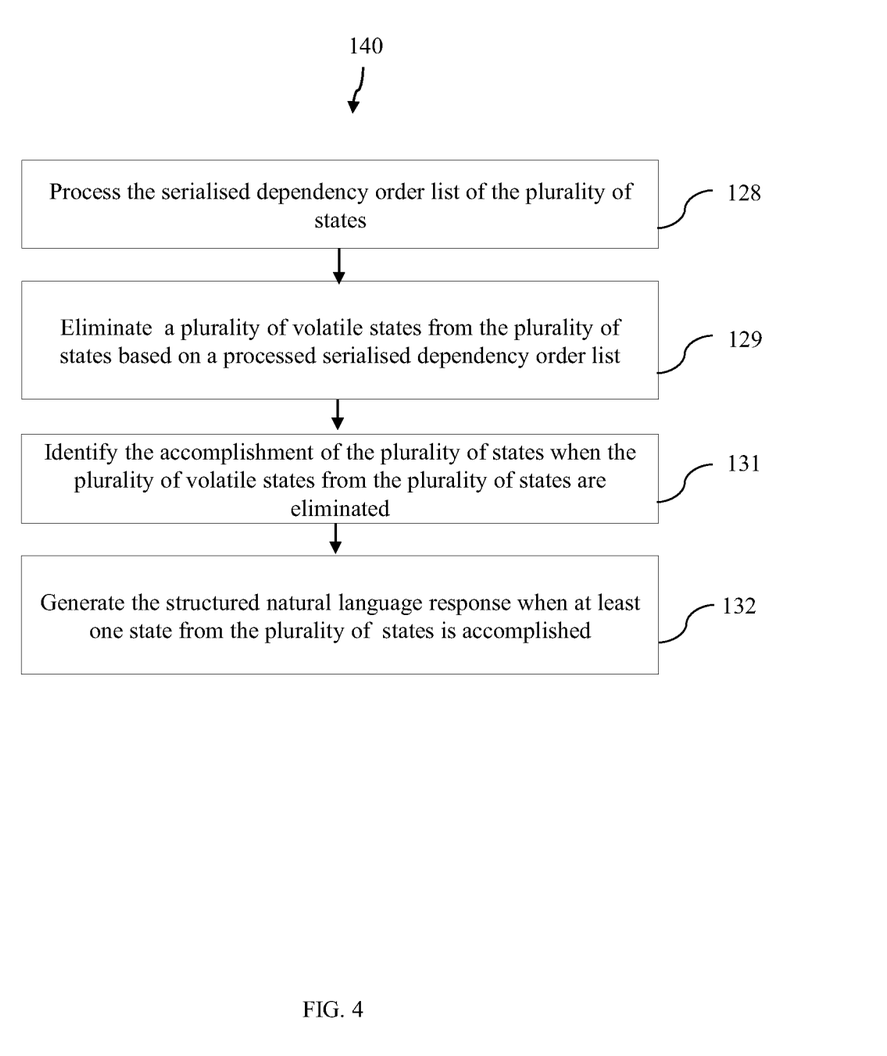
FIG. 4 is a schematic representation of a state-based response generation subsystem of a system for natural language response generation of FIG. 1 in accordance with an embodiment of the present disclosure.

Again, referring back to FIG. 1, the system 100 also includes a state-based response generation subsystem 140 operatively coupled to the state dependency definition subsystem 130. The state-based response generation subsystem 140 is configured to generate a structured natural language response dynamically upon successful execution of the dynamic working procedure. The detailed description of the state-based response generation subsystem is depicted further in FIG. 4. Here, the state-based response generation subsystem 140 processes the serialised dependency order list of the plurality of states in step 128. Again, the state-based response generation subsystem eliminates a plurality of volatile states from the plurality of states based on a processed serialised dependency order list in step 129. Upon elimination, the state-based response generation subsystem identifies the accomplishment of the plurality of states when the plurality of volatile states from the plurality of states are eliminated in step 131. Also, the state-based response generation subsystem generates the structured natural language response when at least one state from the plurality of states is accomplished in step 132.

Figure 5:
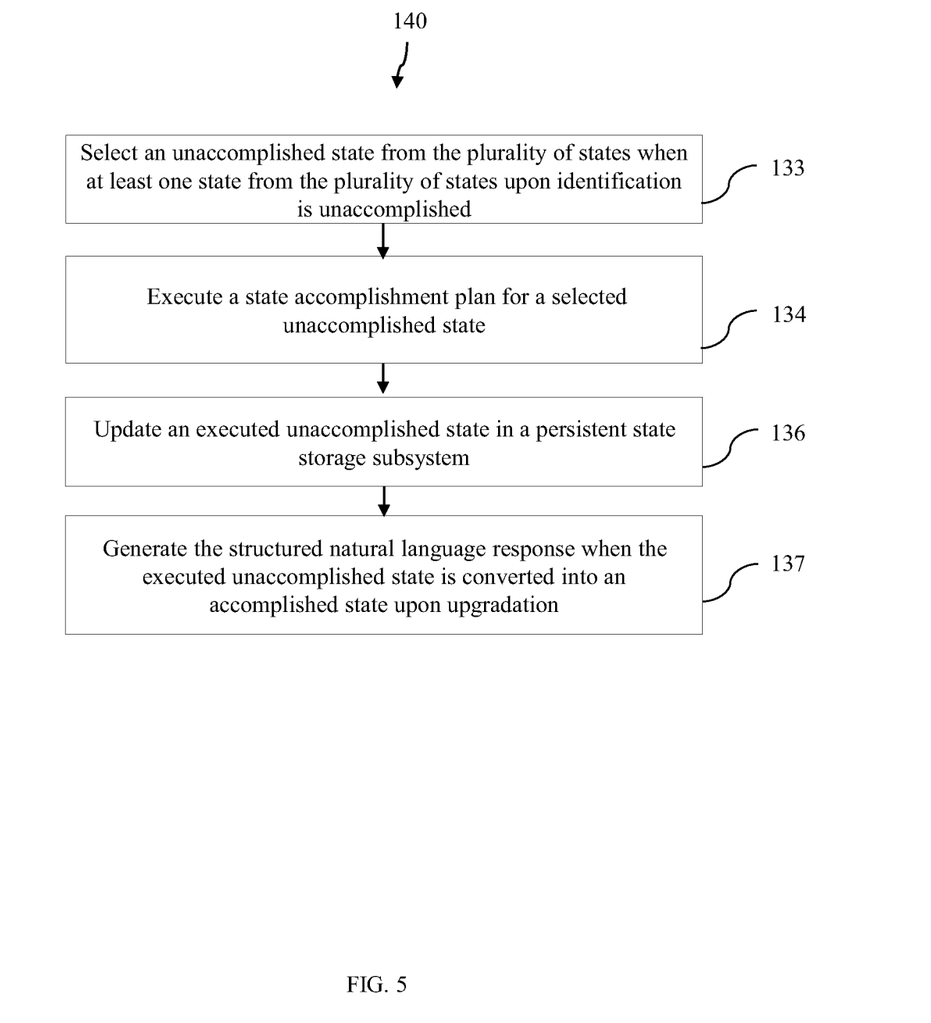
FIG. 5 is a schematic representation of an embodiment of a state-based response generation subsystem of a system for natural language response generation of FIG. 1 in accordance with an embodiment of the present disclosure.

In a specific embodiment, the performance of the state-based response generation subsystem 140 in case of failure in identifying the accomplishment of the plurality of states is described in FIG. 5. The state-based response generation subsystem 140 may select an unaccomplished state from the plurality of states when at least one state from the plurality of states upon identification is unaccomplished in step 133. In such embodiment, the state-based response generation subsystem 140 also executes a state accomplishment plan for a selected unaccomplished state in step 134. The state-based response generation subsystem 140 also updates an executed unaccomplished state in a persistent state storage subsystem in step 136. Also, the state-based response generation subsystem 140 generates the structured natural language response when the executed unaccomplished state is converted into an accomplished state upon upgradation in step 137.

Figure 6:
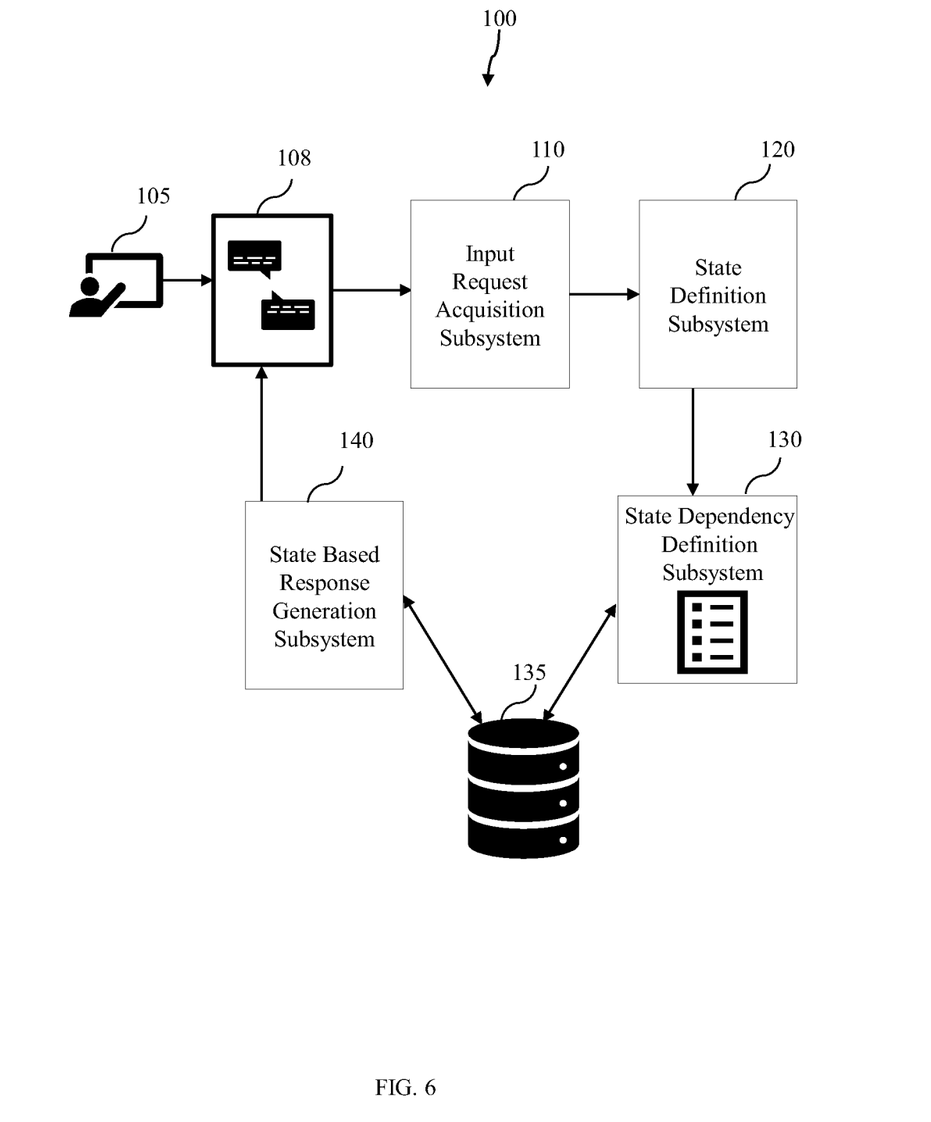
FIG. 6 is a schematic representation of an exemplary embodiment of a system for natural language response generation in accordance with the embodiment of the present disclosure.

FIG. 6 is a schematic representation of an exemplary embodiment of a system 100 for natural language response generation in accordance with the embodiment of the present disclosure. The system 100 for natural language response generation is utilised for implementation of a chatbot, a virtual assistant or for robotic process automation (RPA). The system 100 is generally utilised for task completion and the response generation for which the system 100 requires a combination of inputs received from a plurality of input requests of a user 105, inputs from external information systems or user-defined data transformations. For example, let us assume that the system 100 is utilised by an insurance company 'A' for implementation of their chatbot. Now suppose, a customer or the user 105 of the company 'A' has some queries and starts a conversation 108 with a help of the chatbot. Suppose, the user asks a question "when is my insurance' next premium due date?" So, here, the question of the user 105 which is a natural language input request is obtained by an input acquisition subsystem 110 through at least one information capturing medium. For example, the at least one information capturing medium for the user input request may include a keyboard of an electronic device associated with the user 105.

Once, the natural language input request is obtained, a plurality of states is determined by a state definition subsystem 120. Here, the plurality of states may include a plurality of variables. For example, for an above-mentioned natural language obtained input request, the plurality of states may include at least one of an insurance policy number, an insurance premium due amount, an insurance premium due date, an insurance holder's name, a registered phone number of the insurance holder or a combination thereof. Now, in order to generate a natural language response for the natural language obtained input request, the system 100 includes a state dependency definition subsystem 120. The state dependency definition subsystem 120 is configured to create a list of a plurality of determined states to generate a dependency order. Here, the state dependency subsystem 120 checks whether all values of the plurality of determined states are known or not in a particular session. If all the values are known in the particular session, then the state dependency subsystem 120 omits this process and checks for an analysis of a created dependency order list. Also, the state dependency definition subsystem 120 checks for a plurality of volatile states as such volatile states have a tendency to change the values with every iteration.

For the analysis of the created dependency order list, the state dependency definition subsystem 120 determines values for which of the plurality of determined states may be fulfilled or accomplished via the user request, an API call to an external information system or a data transformation activity. For example, upon analysis, the state dependency definition subsystem 120 may decide that the insurance policy number may be obtained and validated through the user request whose access type may be 'a question'. Again, the insurance premium due amount may be obtained and through the API call to the external information system and may be later validated upon receiving message from the external information system. Similarly, the insurance premium due date may also be obtained through the API call. So, later, the state dependency definition subsystem 120 generates a dynamic working procedure to generate a temporary natural language response corresponding to the plurality of obtained natural language input requests based on a plurality of current states and an analysed dependency order. Here, the dynamic working procedure may be a virtual workflow in which all the plurality of determined states is executed according to the dependency order in order to generate the temporary natural language response. For example, the temporary natural language response may change upon obtaining a desired response.

Also, upon successful execution of the dynamic working procedure, a state-based response generation subsystem 140 generate a structured natural language response. Here, the structured natural language response may include a final response in the natural language which is easily understandable by the user 105.

Figure 7:
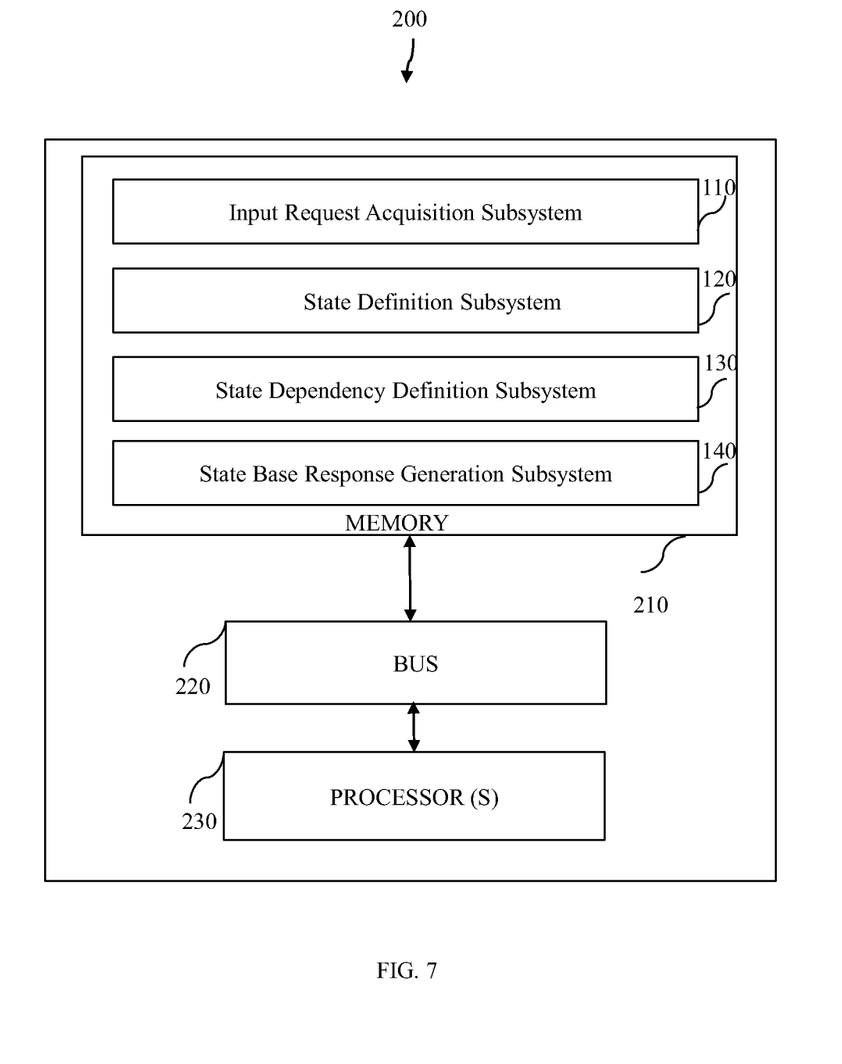
FIG. 7 is a block diagram of a computer or a server in accordance with an embodiment of the present disclosure.

FIG. 7 is a block diagram of a computer or a server in accordance with an embodiment of the present disclosure. The server 200 includes processors 230, and memory 210 operatively coupled to the bus 220.

The processors 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 210 includes a plurality of modules stored in the form of executable program which instructs the processor 230 to perform the method steps illustrated in FIG. 1. The memory 210 is substantially similar to the system 100 of FIG. 1. The memory 210 has following subsystems: an input request acquisition subsystem 110, a state definition subsystem 120, a state dependency definition subsystem 130 and a state-based response generation subsystem 140.

The input request acquisition subsystem 110 configured to obtain a plurality of natural language input requests from one or more sources through at least one information capturing medium. The state definition subsystem 120 is configured to determine a plurality of states for a plurality of obtained natural language input requests. The state dependency definition subsystem 130 is configured to create a list of a plurality of determined states required to generate a dependency order. The state dependency definition subsystem 130 is also configured to analyse a generated dependency order of the plurality of determined states from a created list of the plurality of determined states for state accomplishment. The state dependency definition subsystem 130 is also configured to generate a dynamic working procedure to generate a temporary natural language response corresponding to the plurality of obtained natural language input requests based on a plurality of current states and an analysed dependency order. The state-based response generation subsystem 140 is configured to generate a structured natural language response dynamically upon successful execution of the dynamic working procedure.

Figure 8:
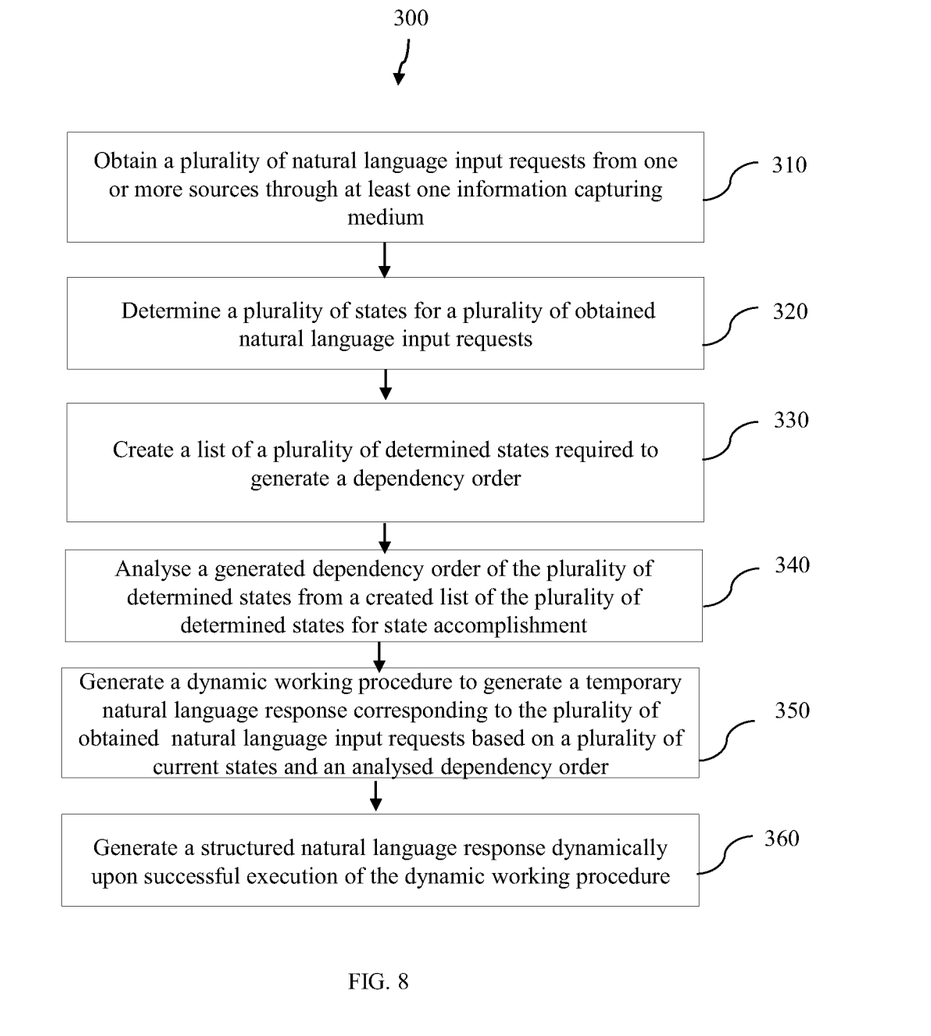
FIG. 8 is a flow chart representing the steps involved in a method for natural language response generation in accordance with the embodiment of the present disclosure.

FIG. 8 is a flow chart representing the steps involved in a method 300 for natural language response generation in accordance with the embodiment of the present disclosure. The method 300 includes obtaining, by an input request acquisition subsystem, a plurality of natural language input requests from one or more sources through at least one information capturing medium in step 310. In one embodiment, obtaining the plurality of natural language input requests from the one or more sources may include obtaining the plurality of natural language input requests which may include at least one of an audio input, a video input, a text input including an alphanumeric character or a combination thereof. In such embodiment, obtaining the plurality of natural language input requests from the one or more sources may include obtaining the plurality of natural language input requests from at least one of a user request, a timer event, an external event or a combination thereof. In some embodiment, obtaining the plurality of natural language input requests from the one or more sources through the at least one medium may include obtaining the plurality of natural language input requests through the at least one of an image capturing device, an audio capturing device, a keyboard, a mouse, a touch screen, an application programming interface (API) call for the internal or an external information system, a series of data transformation activities or a combination thereof.

The method 300 also includes determining, by a state definition subsystem, a plurality of states for a plurality of obtained natural language input requests in step 320. In one embodiment, determining the plurality of states for the plurality of obtained natural language input requests may include determining at least one of a name of the state, a description of the state, a type of the state, a volatility property of the state, an accomplishment method of the state or a combination thereof.

The method 300 also includes creating, by a state dependency definition subsystem, a list of a plurality of determined states required to generate a dependency order in step 330. In some embodiment, creating the list of the plurality of determined states may include creating the list of the plurality of determined states by using a tree-based structure.

The method 300 also includes analysing, by the state dependency definition subsystem, a generated dependency order of the plurality of determined states from a created list of the plurality of determined states for state accomplishment in step 340. In one embodiment, analysing the generated dependency order of the plurality of determined states from the list of the plurality of determined states may include analysing the generated dependency order to enable execution of the plurality of determined states in a correct order for completion of a task and response generation. In such embodiment, the plurality of determined states gathered in every iteration is checked before the execution.

The method 300 also includes generating, by the state dependency definition subsystem, a dynamic working procedure to generate a temporary natural language response corresponding to the plurality of obtained natural language input requests based on a plurality of current states and an analysed dependency order in step 350. In one embodiment, generating the dynamic working procedure to generate the temporary natural language response may include generating a virtual dynamic working procedure by executing the plurality of determined states obtained from the plurality of natural language input requests. In such embodiment, the virtual dynamic working procedure may change upon change in the dependency order of the plurality of determined states.

The method 300 also includes generating, by a state-based response generation subsystem, a structured natural language response dynamically upon successful execution of the dynamic working procedure in step 360. In one embodiment, generating the structured natural language response may include generating the structured natural language response upon successful execution of the dynamic working procedure, wherein the plurality of determined states is successfully executed in the correct dependency order.

Various embodiments of the present disclosure enable creation of chatbots or other virtual assistants that needs complex workflow and integration with a variety of information systems to be built by subject matter experts without having to write or modify any computer programs.

Moreover, the present disclosed system a process to create a state-based workflow for chatbots that allows the chatbot to generate a dynamic workflow based on what it needs to carry out a task and what information it already has which makes the chatbot behaviour more human-like.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A system for state dependency-based task execution and a natural language response generation comprising:
   an input request acquisition subsystem configured to obtain a plurality of natural language input requests from one or more sources through at least one information capturing medium wherein the plurality of natural language input requests comprises at least one of an audio input, a video input, a text input comprising an alphanumeric character or a combination thereof;
   a state definition subsystem operatively coupled to the input request acquisition subsystem, wherein the state definition subsystem is configured to determine a plurality of states for a plurality of obtained natural language input requests;
   a state dependency definition subsystem operatively coupled to the state definition subsystem, wherein the state dependency definition subsystem 130 is configured to:
      create a list of a plurality of determined states required to generate a dependency order;
      analyse a generated dependency order of the plurality of determined states from a created list of the plurality of determined states for state accomplishment;
      generate a dynamic working procedure to generate a temporary natural language response corresponding to the plurality of obtained natural language input requests based on a plurality of current states and an analysed dependency order, and a state-based response generation subsystem (140) operatively coupled to the state dependency definition subsystem (130), wherein the state-based response generation subsystem (140) is configured to generate a structured natural language response dynamically upon successful execution of the dynamic working procedure, wherein the state-based response generation subsystem (140) is configured to:
  process the serialised dependency order list of the plurality of states (128);
  eliminate a plurality of volatile states from the plurality of states based on a processed serialised dependency order list (129);
  identify the accomplishment of the plurality of states when the plurality of volatile states from the plurality of states are eliminated (131); and
  generate the structured natural language response when at least one state from the plurality of states is accomplished (132).

2. The system as claimed in claim 1, wherein the one or more sources comprises at least one of a user request, a timer event, an external event or a combination thereof.

3. The system as claimed in claim 1, wherein the at least one information capturing medium comprises at least one of image capturing device, an audio capturing device, a keyboard, a mouse, a touch screen, an information system interface call for an internal or an external information system, a series of data transformation activities or a combination thereof.

4. The system as claimed in claim 1, wherein the plurality of determined states comprises at least one of a name of the state, a description of the state, a type of the state, a volatility property of the state, an accomplishment method of the state or a combination thereof.

5. A method comprising:
  obtaining, by an input request acquisition subsystem, a plurality of natural language input requests from one or more sources through at least one information capturing medium wherein the plurality of natural language input requests comprises at least one of an audio input, a video input, a text input comprising an alphanumeric character or a combination thereof;
  determining, by a state definition subsystem, a plurality of states for a plurality of obtained natural language input requests;
  creating, by a state dependency definition subsystem, a list of a plurality of determined states required to generate a dependency order;
  analysing, by the state dependency definition subsystem, a generated dependency order of the plurality of determined states from a created list of the plurality of determined states for state accomplishment;
  generating, by the state dependency definition subsystem, a dynamic working procedure to generate a temporary natural language response corresponding to the plurality of obtained natural language input requests based on a plurality of current states and an analysed dependency order; and
  generating, by a state-based response generation subsystem, a structured natural language response dynamically upon successful execution of the dynamic working procedure;
  wherein generating, by the state-based response generation subsystem comprises processing the serialised dependency order list of the plurality of states;
  eliminating a plurality of volatile states from the plurality of states based on a processed serialised dependency order list;
  identifying the accomplishment of the plurality of states when the plurality of volatile states from the plurality of states are eliminated;
  generating the structured natural language response when at least one state from the plurality of states is accomplished.

6. The method as claimed in claim 5, wherein determining, by the state definition subsystem, a plurality of states for a plurality of obtained natural language input requests comprises:
  determining a plurality of states;
  selecting a state accomplishment method of a plurality of determined states for the one or more sources;
  selecting a state accomplishment method of a plurality of determined states for the one or more sources.

7. The method as claimed in claim 5, wherein generating, by the state dependency definition subsystem, the dynamic working procedure to generate a temporary natural language response corresponding to the plurality of acquired natural language input requests based on a plurality of current states and an analysed dependency order comprises generating the dynamic working procedure by:
  creating a task for the plurality of natural language input requests obtained from the one or more sources;
  analysing a requirement of the plurality of states for the plurality of natural language input requests for one or more purposes, wherein the one or more purposes comprises a requirement of the plurality of states for embedding in a natural language response text, requirement of the plurality of states for an interactive user interface for the natural language response and the requirement of the plurality of states for task completion;
  examining a plurality of analysed states required for the one or more purposes;
  creating a serialised dependency order list based on an examination of the plurality of analysed states required for the one or more purposes.

8. The method as claimed in 5, wherein identifying the accomplishment of the plurality of states comprises identifying the accomplishment of the plurality of states by:
  selecting an unaccomplished state from the plurality of states when at least one state from the plurality of states upon identification is unaccomplished;
  executing a state accomplishment plan for a selected unaccomplished state;
  updating an executed unaccomplished state in a persistent state storage subsystem;
  generating the structured natural language response when the executed unaccomplished state is converted into an accomplished state upon upgradation.

* * * * *